United States Patent

Pinkham

[15] 3,665,104

[45] May 23, 1972

[54] PHASING AND BACKSTROKE BLACK CONTROL CIRCUIT FOR FACSIMILE

[72] Inventor: Roger A. Pinkham, Lake Hiawatha, N.J.

[73] Assignee: EG & G, Inc., Bedford, Mass.

[22] Filed: Dec. 7, 1970

[21] Appl. No.: 95,838

[52] U.S. Cl. ..........178/69.5 F, 178/7.1

[51] Int. Cl. ..........H04n 1/02

[58] Field of Search ..........178/69.5 F, 7.1, DIG. 2, DIG. 22; 328/187, 179

[56] References Cited

UNITED STATES PATENTS 2,512,547 6/1950 Kleis et al. ..........178/7.1

2,685,612 8/1954 Lansil ..........178/69.5 F

*Primary Examiner*—Robert L. Richardson
*Assistant Examiner*—Richard P. Lange
*Attorney*—Ralph L. Cadwallader and Leo M. Kelly

[57] ABSTRACT

A facsimile marking circuit provides short phasing pulse marks on an unmarked background during the phasing operation, and provides an unmarked margin during the backstroke interval. The circuit includes a source of marking signals operative during the phasing period and blocking means for these marking signals in the absence of backstroke pulses. After the phasing period blocking means is effective during the presence of the backstroke pulses.

8 Claims, 3 Drawing Figures

INVENTOR.
ROGER A PINKHAM
BY
Edward J. Timmons
Atty

PHASING AND BACKSTROKE BLACK CONTROL CIRCUIT FOR FACSIMILE

BACKGROUND OF THE INVENTION

Facsimile systems usually include a transmitter at one location and a recorder at a spaced location connected by a wire or radio system. The transmitter provides a line-by-line dissection of the image of a document or photograph to be transmitted between the transmitter and the recorder. The image dissector includes a drum carrying a helical light slit which is rotatable passed a fixed support carrying a straght light slit. The copy is illuminated as it is moved through the transmitter and light reflected from the copy is passed through the image dissector to a photoelectric device for conversion to an analogue type electric signal which is transmitted to the receiver.

At the receiver a read out device converts the analog signal to copy. The read out device may include a plurality of stylii equally spaced on a timing belt which carries the stylii transversely across a strip of recording medium, simultaneously the recording medium is moved lengthwise. The recorded signals are sequentially applied to each stylus as it moves past the surface of the recording medium.

Electrolytic, and more recently electrostatic, recording mediums have been used, both being marked in the same manner excepting that the electrolytic recording medium is marked with a lower voltage and higher current than is required for applying a charge to the electrostatic medium. The received signals are converted back to picture elements on the recording medium so that the photograph or the document at the transmitter is reproduced at the receiver.

The video signal is a continuous analog signal which represents a line of scan, a backstroke pulse, and another continuous analog signal represents the next line of scan, etc. It is obvious that the recorder at the receiver must be brought into phase with the transmitted signal so that the line of scan starts properly at the lefthand margin. In the usual facsimile recorder phasing is achieved before the transmission of copy by operating the motor of the recorder at somewhat above synchronous speed and dropping the speed of the recorder motor back to synchronous speed upon achieving proper phase position.

In the usual facsimile circuit design a choice is provided of designing the circuit so that the backstroke interval pulse is either a marking or black pulse or a non-marking or white pulse. In the event a design is selected in which the backstroke pulse is a white pulse the margin of the transmitted copy will be unmarked or white while during unphasing operation the phasing pulses will be short white marks on a marked or black background. The circuit in accordance with the present invention eliminates the black line running across the page during the phasing operation and substitutes therefor a short black line representing the phasing pulse, this short line dropping line-by-line as the copy is scanned and moving across the page until phasing is achieved. In addition the circuit provides copy with white margins during the backstroke interval.

SUMMARY OF THE INVENTION

A circuit is provided which produces a black signal during the phasing interval. First blocking means is operative to block the video signal in the absence of the backstroke or phasing signal so that a black marking signal is passed only while the backstroke or phasing pulse is present. After the phasing interval the first blocking means is inoperative and a second blocking means is provided to block a black signal responsive to the presence of a backstroke pulse. The circuit in accordance with the invention produces a white margin during the backstroke interval and produces a white space between copy during the phasing interval excepting for the short black phasing pulse lines.

DESCRIPTION OF THE PREFERRED EMBODIMENT

Figure 1:
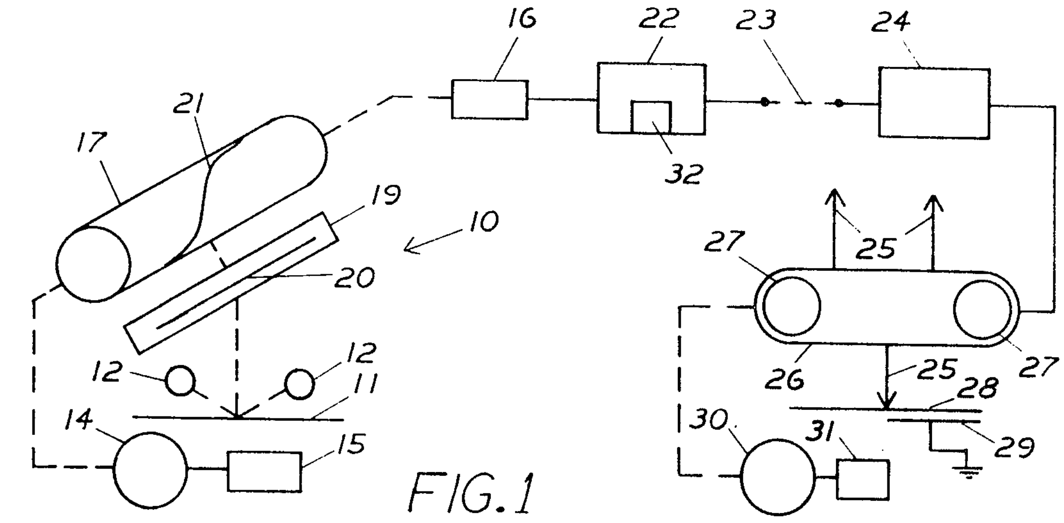
FIG. 1 is a schematic diagram illustrating a facsimile transmitter and receiver including a circuit in accordance with the invention as part of the transmitter electronics.

Referring to the drawings there is shown in FIG. 1 a facsimile transmitter 10 with a piece of copy such as a document or photograph 11 being moved past a pair of viewing lights 12 by a motor 14 operated by a control 15. Interposed between the copy 11 and a photoelectric device 16 is a light dissector including a rotatable helix drum 17 and a fixed member 19 having a straight narrow light path 20 positioned thereon. The rotatable drum 17 has a helical light path 21 adapted to cooperate with the light path 20 so that light reflected from the copy 11 is passed to the interior of the helix drum 17 in a line-by-line image dissection manner. The helix drum 17 may be rotated by the motor 14 or may be driven separately by another motor drive. The light passed to the interior of the helix drum 17 is picked up by the photoelectric device 16 and passed through the usual transmitter electronics 22 and a transmission line 23 to usual recorder electronics 24. The output is passed to one or more equally spaced stylii 25 carried by a belt 26 passed over a pair of rollers or pulleys 27. A suitable recording medium 28, preferably electrostatic paper, is moved past the transverse path of the stylii 25 and over a grounded platen 29 by a motor 30 supplied by a control supply 31. The recording medium 28, if electrostatic paper, is then passed through a toner as is well known in the art.

Figure 2:
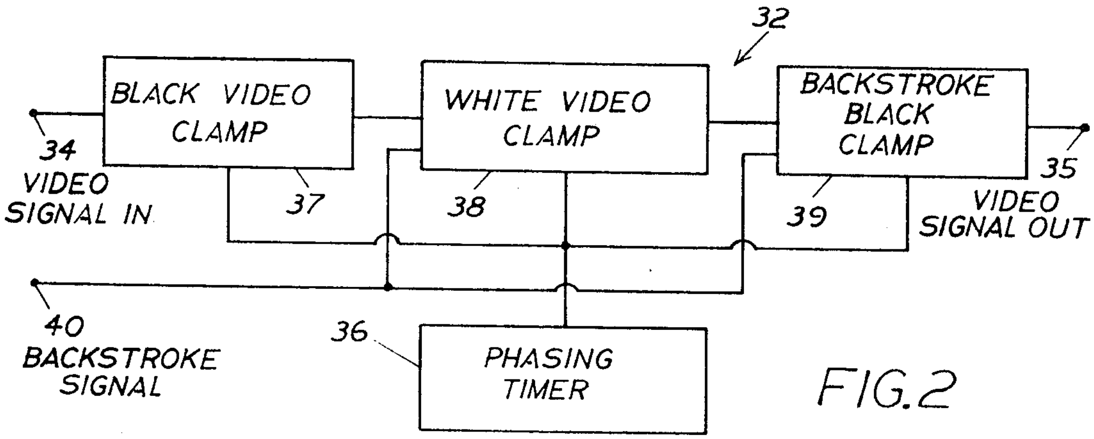
FIG. 2 is a block diagram illustrating the phasing and backstroke black control circuit in accordance with the invention.

In the operation of the facsimile device the copy 11 is passed by the lamps 12 so that light is reflected through the straight line path and helical line path in series to the interior of the helix drum 17. This light is picked up by the photoelectric device 16 and converted to an analog signal which is passed through transmitter electronics 22, transmission line 23 and recorder electronics 24 to one of the stylii 25. The electronics is such that a mark is made on the copy medium by the stylii 25 corresponding to a mark viewed by the image dissector drum 17. Circuit 32 shown in block diagram in FIG. 2 is incorporated as a portion of the transmitter electronics 22 of FIG. 1.

The phasing and backstroke control circuit 32 of the facsimile transmitter in accordance with the invention is adapted to receive the facsimile video signal in a terminal 34 and treat the signal which is passed to an outlet 35. The circuit includes a phasing timer 36 adapted to be operated for a period of about 15 seconds during the phasing operation and controlled by the usual phasing mechanism. This timer controls a black video clamp circuit 37, a white video clamp circuit 38, and a backstroke white clamp 39. The timer 36 renders the black and white video clamp circuits 37 and 38 operative, and at the same time renders the backstroke white clamp 39 inoperative. The black video clamp 37 causes the video signal to indicate black irrespective of the information content of the incoming video signal.

A backstroke signal 40 is applied to the white video clamp 38, and to the backstroke white clamp 39. While the phasing timer 36 is in operation the backstroke signal pulse renders the white clamp 38 ineffective for the duration of the pulse so that a black signal is passed to the backstroke white clamp circuit 39. Thus a series of black marking pulses are produced representative of the backstroke or phasing pulse. After the expiration of the prephasing interval the phasing timer 36 becomes inoperative, disabling the black video clamp 37 and the white video clamp 38 and allows the backstroke white clamp 39 to become operative, providing a white backstroke or margin.

Figure 3:
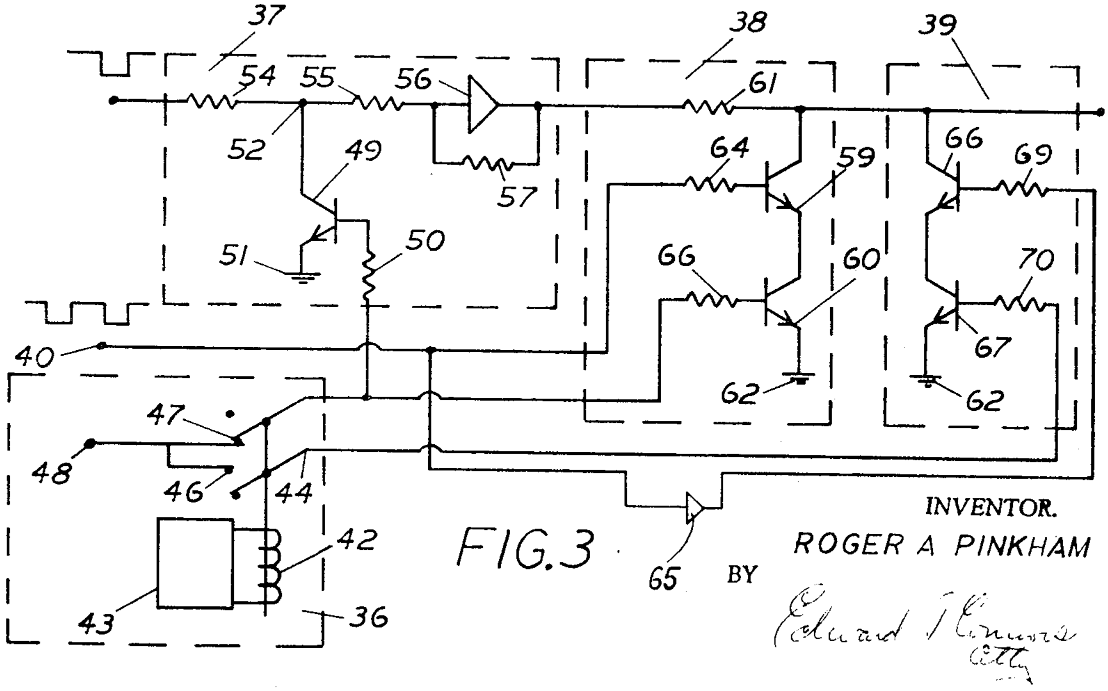
FIG. 3 is a schematic wiring diagram of the block circuit shown in FIG. 2.

A schematic wiring diagram of the circuit in accordance with the invention is shown in FIG. 3. The parts of the circuit shown in block diagram in FIG. 2 are outlined by dashed lines in FIG. 3. The phasing timer 36 may be a relay 42 controlled by circuitry 43 well known in the art and incorporated as a part of the transmitter electronics 22. The relay 42 operates a two pole two position switch 44 having contacts 46 and 47 connected to a positive 12 volt supply 48. The 12 volt potential is used to control the clamps 37, 38 and 39.

The black video clamp 37 includes an NPN transistor 49 having its base connected through the switch 44 through a resistor 50 to the 12 volt supply while its emitter is grounded as indicated at 51 and its collector is connected to the midpoint 52 between attuation resistor 54 and gain control resistor 55. An inverting amplifier 56 is bypassed by a feedback resistor 57. The black video clamp 37 operates to apply a black or zero signal when the transistor 49 is closed by the application of potential to its base through the switch 44 from the 12 volt positive power supply.

The white video clamp 38 includes a pair of series connected transistors 59 and 60 connected from the video bus 61 to ground as indicated at 62. Transistor 59 has its collector connected to the video bus 61, its emitter connected to the collector of transistor 60, and its base connected through a resistor 64 to the input 40 for the backstroke pulse. Transistor 60 has its emitter connected to ground at 62 and its base connected through a resistor 66 to the positive power supply 48 through the two pole two position switch 44. When the timer 43 is energized so as to actuate its relay 42 to close the switch 44 the transistor 60 is closed, and the transistor 59 is controlled by pulses entering its base. Thus transistors 59 and 60 are both closed excepting during the presence of a backstroke or phasing pulse holding the video signal bus 61 to zero, but in the presence of backstroke pulses transistor 59 opens so that a black phasing signal is provided.

The backstroke white clamp 39 includes a pair of series connected transistors 66 and 67 connected between the video signal bus 61 and the ground 62. The collector of the transistor 66 is connected to the video bus 61 while its emitter is connected to the collector of the transistor 67 and its base is connected through a resistor 69 to the backstroke bus terminal 40 ahead of the backstroke pulse inverter 65. The transistor 67 has its emitter connected to the ground 62 and its base connected through a resistor 70 to the switch 44 so that it is energized only when the relay 42 is opened at the end of the phasing period, at which time the switch 44 connects the positive power supply 48 through the resistor 70 to the base of the transistor 67 turning it on. After the phasing period the backstroke white clamp 39 is effective when its transistor 66 is closed by reason of receiving an inverted backstroke pulse from inverter 65 in series with the input 40.

The operation will be briefly described with reference to the schematic circuit shown in FIG. 3. During the phasing period the relay 42 is closed thereby providing voltage to the base of the transistors 49 and 60 turning these transistors on. Transistor 49 causes a black level to be provided to the video bus 61. Upon the absense of a backstroke at the terminal 40 transistor 59 is turned on clamping the output video bus 61 to a zero cancel level or white signal level. During the backstroke period transistor 59 is opened allowing the black level provided by the function of transistor 49 to be provided to the output video bus 61 such that black phasing pulses occur. During this interim the backstroke white clamp has been disabled by the timer since transistor 67 is open. When the 15 second phasing duration has been completed relay 42 opens such that a voltage is provided to the base of transistor 67 turning it on. The operation of relay 44 has thus deactivated transistors 49 and 60 such that the black video clamp 37 and the white video clamp 38 are disabled. Thus normal video will be provided to the video bus 61 except when transistor 66 is turned on. This occurs during the backstroke to provide a white margin, as the backstroke input 40 is inverted by amplifier 65 turning on transistor 66 such that the video bus 61 is clamped to a white level. Thus during the phasing period the video bus 61 is clamped to a white level except to provide black phasing pulses while during the copy transmission time the video bus 61 is clamped to a white level providing a white margin.

While the invention has been described and illustrated with reference to a specific embodiment thereof it is to be understood that other embodiments may be resorted to without departing from the invention. For example, while conventional circuits have been shown such as transistors, relays, etc., it is to be understood that such elements may be replaced by integrated circuits if desired. Therefore, the form of the invention set out above should be considered as illustrative and not as limiting the following claims.

I claim:

1. A marking control circuit for a facsimile transmitter, the circuit providing short phasing pulse marks on an unmarked background during the phasing operation and providing an unmarked margin for the backstroke interval during the recording operation, the circuit comprising a timer operative for a predetermined time interval for the phasing operation, means providing a video signal, means providing a backstroke pulse, normally inoperative means providing a marking signal operative responsive to said timer and said video signal, normally inoperative first signal blocking means operative responsive to said timer and said marking signal and rendered inoperative by a backstroke pulse so that during said timed interval marking signals are passed only responsive to said backstroke pulse, and normally inoperative second signal blocking means responsive to the backstroke pulse and said first signal blocking means and rendered inoperative by said timer so that after said timed interval no marking signals are passed during said backstroke pulse.

2. A marking control circuit according to claim 1 in which said timer includes a power supply and a switch with two output terminals so that the timer when operative supplies power to one output terminal and when inoperative supplies power to the other output terminal.

3. A marking control circuit according to claim 2 in which said normally inoperative means providing a marking signal operative responsive to said timer includes a transistor connected between said means providing a video signal and ground and controlled by said one timer output so that a marking signal is produced while said timer is energized.

4. A marking control circuit according to claim 2 in which said normally inoperative first signal blocking means includes a pair of transistors connected in series, invertor means is provided for said video signal, circuit means is provided connecting one of said transistors to said one output terminal of said timer so that the one of said transistors is turned on when said timer is energized, and circuit means is provided connecting the other of said transistors to said means providing a backstroke pulse so that the other of said transistors is turned off during said backstroke interval whereby phasing pulse mark signals are passed.

5. A marking control circuit according to claim 2 in which said normally inoperative second signal blocking means includes a pair of transistors connected in series, invertor means is provided for said backstroke pulse, circuit means is provided connecting one of said transistors to said other output terminal of said timer so that the one of said transistors is turned on when said timer is deenergized, and circuit means is provided connecting the other of said transistors to said means providing a backstroke pulse so that said other of said transistors is turned on during said backstroke interval whereby no marking pulses are passed during said backstroke pulse.

6. A marking control circuit according to claim 1 in which said timer includes a power supply and a switch with two output terminals so that the timer when operative supplies power to one output terminal and when inoperative supplies power to the other output terminal, said normally inoperative means providing a marking signal operative responsive to said timer including a transistor connected between said means providing a video signal and ground and controlled by said one timer output so that a marking signal is produced while said timer is energized.

7. A marking control circuit according to claim 1 in which said timer includes a power supply and a switch with two output terminals so that the timer when operative supplies power to one output terminal and when inoperative supplies power to the other output terminal, said normally inoperative means providing a marking signal operative responsive to said timer including a transistor connected between said means providing a video signal and ground and controlled by said one timer output so that a marking signal is produced while said timer is energized, said normally inoperative first signal blocking means includes a pair of transistors connected in series, invertor means is provided for said video signal, circuit means is provided connecting one of said transistors to said one output terminal of said timer so that the one of said transistors is turned on when said timer is energized, and circuit means is provided connecting the other of said transistors to said means providing a backstroke pulse so that the other of said transistors is turned off during said backstroke interval whereby phasing pulse mark signals are passed.

8. A marking control circuit according to claim 1 in which said timer includes a power supply and a switch with two output terminals so that the timer when operative supplies power to one output terminal and when inoperative supplies power to the other output terminal, said normally inoperative means providing a marking signal operative responsive to said timer includes a transistor connected between said means providing a video signal and ground and controlled by said one timer output so that a marking signal is produced while said timer is energized, said normally inoperative first signal blocking means includes a pair of transistors connected in series, invertor means is provided for said video signal, circuit means is provided connecting one of said transistors to said one output terminal of said timer so that the one of said transistors is turned on when said timer is energized, circuit means is provided connecting the other of said transistors to said means providing a backstroke pulse so that the other of said transistors is turned off during said backstroke interval whereby phasing pulse mark signals are passed, said normally inoperative second signal blocking means includes a pair of transistors connected in series, invertor means is provided for said backstroke pulse, circuit means is provided connecting one of said transistors to said other output terminal of said timer so that the one of said transistors is turned on when said timer is deenergized, and circuit means is provided connecting the other of said transistors to said means providing a backstroke pulse so that said other of said transistors is turned on during said backstroke interval whereby no marking pulses are passed during said backstroke pulse.

* * * * *